(12) United States Patent
Yoon et al.

(10) Patent No.: US 10,824,266 B2
(45) Date of Patent: Nov. 3, 2020

(54) TOUCH SCREEN-INTEGRATED DISPLAY DEVICE

(71) Applicant: LG DISPLAY CO., LTD., Seoul (KR)

(72) Inventors: Kyuhan Yoon, Daegu (KR); Jungwoo Han, Gumi-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/383,876

(22) Filed: Apr. 15, 2019

(65) Prior Publication Data

US 2019/0243506 A1  Aug. 8, 2019

Related U.S. Application Data

(63) Continuation of application No. 15/291,659, filed on Oct. 12, 2016, now Pat. No. 10,282,016.

(30) Foreign Application Priority Data

Nov. 30, 2015  (KR) .......................... 10-2015-0169456

(51) Int. Cl.
*G06F 3/041* (2006.01)
*G06F 3/044* (2006.01)
(Continued)

(52) U.S. Cl.
CPC .......... *G06F 3/0416* (2013.01); *G02F 1/1343* (2013.01); *G02F 1/13338* (2013.01);
(Continued)

(58) Field of Classification Search
CPC ............... G02F 1/13338; G02F 1/1343; G02F 1/134363; G06F 3/0412; G06F 3/0416; G06F 3/044; G06F 2203/04103
See application file for complete search history.

(56) References Cited

U.S. PATENT DOCUMENTS

| 7,130,009 B2 * | 10/2006 | Saigo ................. G02F 1/134363 |
| | | 349/141 |
| 7,466,389 B2 * | 12/2008 | Nomura ................. G02F 1/1345 |
| | | 349/138 |

(Continued)

FOREIGN PATENT DOCUMENTS

| CN | 101501618 A | 8/2009 |
| CN | 103365007 A | 10/2013 |

(Continued)

OTHER PUBLICATIONS

First Office Action issued in Chinese Patent Application No. 201610947512.8 dated May 30, 2019.

(Continued)

*Primary Examiner* — Vinh T Lam
(74) *Attorney, Agent, or Firm* — Polsinelli PC

(57) ABSTRACT

There is provided a touch screen-integrated display device. The touch screen-integrated display device includes: a substrate including an active area including a plurality of subpixels and a non-active area; a gate line and a data line to define one subpixel; a thin-film transistor disposed in subpixel; a first electrode electrically connected to a source electrode of the thin-film transistor; and a second electrode disposed to be overlapped with the first electrode with a protective layer interposed therebetween, and further includes a pad connection layer configured to connect the line pad and the signal supply pad in the non-active area. Thus, it is possible to reduce a contact resistance between the signal supply pad and the line pad and also possible to suppress damage to the pad connection layer.

20 Claims, 17 Drawing Sheets

(51) Int. Cl.
*G02F 1/1333* (2006.01)
*G02F 1/1343* (2006.01)

(52) U.S. Cl.
CPC ........ *G02F 1/134363* (2013.01); *G06F 3/044* (2013.01); *G06F 3/0412* (2013.01); *G06F 2203/04103* (2013.01)

(56) References Cited

U.S. PATENT DOCUMENTS

| | | | |
|---|---|---|---|
| 7,633,595 B2* | 12/2009 | Kim | G02F 1/133707 349/106 |
| 8,928,597 B2* | 1/2015 | Jang | H01L 27/323 345/173 |
| 9,046,955 B1 | 6/2015 | Lee et al. | |
| 9,741,745 B2* | 8/2017 | Cai | H01L 27/124 |
| 2008/0062140 A1* | 3/2008 | Hotelling | G02F 1/1362 345/173 |
| 2009/0201449 A1* | 8/2009 | Nishida | G02F 1/134363 349/114 |
| 2009/0279027 A1* | 11/2009 | Nishida | G02F 1/133555 349/114 |
| 2009/0290085 A1* | 11/2009 | Chang | G02F 1/133345 349/54 |
| 2010/0020256 A1* | 1/2010 | Lee | G02F 1/136209 349/39 |
| 2010/0295807 A1* | 11/2010 | Xie | G06F 3/0414 345/173 |
| 2010/0302474 A1* | 12/2010 | Katoh | H01L 24/97 349/58 |
| 2011/0234932 A1* | 9/2011 | Jung | G02F 1/13452 349/40 |
| 2012/0113039 A1* | 5/2012 | Nghiem | G06F 3/04166 345/173 |
| 2012/0188498 A1* | 7/2012 | Nishino | G02F 1/1345 349/143 |
| 2012/0268396 A1 | 10/2012 | Kim et al. | |
| 2013/0155059 A1 | 6/2013 | Wang et al. | |
| 2013/0321366 A1 | 12/2013 | Kozuma et al. | |
| 2014/0300852 A1* | 10/2014 | Yoshida | G02F 1/136286 349/143 |
| 2015/0070643 A1* | 3/2015 | Kim | H01L 27/1255 349/139 |
| 2015/0091015 A1 | 4/2015 | Park et al. | |
| 2015/0153877 A1 | 6/2015 | Han et al. | |
| 2015/0185577 A1* | 7/2015 | Shih | G02F 1/1345 349/138 |
| 2015/0301603 A1* | 10/2015 | Maggiali | H03K 17/9622 345/174 |
| 2015/0316802 A1* | 11/2015 | Takanishi | G02F 1/136227 349/43 |
| 2015/0331508 A1 | 11/2015 | Nho et al. | |
| 2015/0331530 A1* | 11/2015 | Kim | G06F 3/044 345/174 |
| 2016/0011687 A1* | 1/2016 | Ding | G06F 3/0412 345/174 |
| 2016/0034082 A1* | 2/2016 | Zhang | G09G 3/36 345/173 |
| 2016/0098113 A1* | 4/2016 | Ding | G06F 3/044 345/174 |
| 2016/0124259 A1* | 5/2016 | Kawata | H01L 27/124 349/139 |
| 2016/0187692 A1* | 6/2016 | Woo | H01L 23/522 257/72 |
| 2016/0195969 A1* | 7/2016 | Kim | G06F 3/0446 345/173 |
| 2016/0202800 A1* | 7/2016 | Itaya | G06F 3/047 345/174 |
| 2016/0282690 A1* | 9/2016 | Hong | G02F 1/136286 |
| 2016/0291757 A1 | 10/2016 | Ding et al. | |
| 2016/0299392 A1* | 10/2016 | Cheng | G02F 1/134309 |
| 2016/0313478 A1* | 10/2016 | Lee | H01L 51/0097 |
| 2016/0328035 A1* | 11/2016 | Zou | G06F 3/044 |
| 2016/0328058 A1* | 11/2016 | Peng | H01L 27/1222 |
| 2016/0334656 A1* | 11/2016 | Senokuchi | G02F 1/1339 |
| 2017/0017335 A1* | 1/2017 | Takahashi | G06F 3/044 |
| 2017/0045767 A1* | 2/2017 | Xu | G02F 1/1335 |
| 2017/0168617 A1* | 6/2017 | Qu | H01L 27/1262 |
| 2017/0184893 A1* | 6/2017 | Saitoh | G02F 1/134309 |
| 2017/0322650 A1 | 11/2017 | Liu et al. | |

FOREIGN PATENT DOCUMENTS

| | | |
|---|---|---|
| CN | 105094422 A | 11/2015 |
| JP | 2014-049438 A | 3/2014 |
| KR | 20140141247 A | 12/2014 |

OTHER PUBLICATIONS

Office Action with English Translation dated Nov. 7, 2017 issued in the corresponding Japanese Patent Application No. 2016-233554, pp. 1-6.

Search Report dated May 4, 2017 issued in the corresponding European Patent Application No. 16200773.6, pp. 1-8.

* cited by examiner

TOUCH SCREEN-INTEGRATED DISPLAY DEVICE

CROSS-REFERENCE TO RELATED APPLICATIONS

This application is a continuation of U.S. patent application Ser. No. 15/291,659 filed Oct. 12, 2016, now allowed, which claims priority from Korean Patent Application No. 10-2015-0169456, filed in the Republic of Korea on Nov. 30, 2015, which are hereby incorporated by reference in their entireties for all purposes as if fully set forth herein.

BACKGROUND

Field of the Disclosure

The present disclosure relates to a display device, and more particularly, to a touch screen-integrated display device. Although the present disclosure is suitable for a wide scope of applications, it is particularly suitable for improving contact characteristics of the touch screen-integrated display device.

Description of Background

With progress of information-oriented society, various types of demands for display devices for displaying image are increasing. Recently, various types of display devices such as a liquid crystal display (LCD) device, a plasma display panel (PDP) device, and an organic light emitting display (OLED) device have been used.

Such display devices are breaking away from the conventional input systems, such as a button, a keyboard and a mouse, and a touch-based input system which allows a user to intuitively and conveniently input information or instructions has been developed.

In order to provide such a touch-based input system, it is required to identify a touch or non-touch of user and exactly detect touch coordinates.

According to the related art, various touch modes such as a resistance film mode, a capacitance mode, an electromagnetic induction mode, an infrared mode, and an ultrasonic mode are provided for touch sensing.

Further, regarding application of a touch screen to a display device, a technology of installing a touch sensor within a display device has been developed. In particular, an in-cell type display device using a common electrode formed on a lower substrate as a touch electrode has been developed.

The display device includes a display panel in which data lines and gate lines are disposed and subpixels defined at intersections between the data lines and the gate lines are disposed, that is, one of the gate lines and one of the data lines define a subpixel. A data driver configured to supply a data voltage to the data lines, a gate driver configured to drive the gate lines, and a controller configured to control the driving timing of the data driver and the gate driver.

A conventional gate driver has been used by manufacturing a separate gate driver IC integrated with a shift register of the gate driver and connecting the gate driver IC to a gate line pad of a display panel through a TCP process or the like.

However, in recent years, a gate-in-panel (GIP) technology of directly forming a shift register of a gate driver on a display panel has been applied.

According to the GIP technology, GIP circuits configured as thin film transistors are formed on a display panel and control signal lines for supplying a clock signal CLK to the GIP circuits are formed together on the display panel.

The control signal lines are formed on a substrate with a gate line. However, in an in-cell touch screen display device, the control signal lines are formed on a passivation layer when a touch sensing line is formed on the passivation layer.

Particularly, one ends of the control signal lines formed on the display panel are connected to signal supply pads formed on the same layer as the gate line in a jumping structure through a pad connection layer.

However, in order to expose the signal supply pads, a contact hole needs to be formed by removing a part of the passivation layer, a gate insulation layer, and a protective layer. However, since the passivation layer has a great thickness, the pad connection layer can be disconnected or cracks because the pad connection layer is disposed on a steep slope of the passivation layer.

Particularly, in a high-temperature and high-humidity environment caused by driving of the display device, micro cracks are easily generated in the pad connection layer to deteriorate image quality.

SUMMARY

Accordingly, an aspect of the present disclosure provides a touch screen-integrated display device which is improved in contact characteristics by removing a passivation layer from a signal supply pad and control signal lines for supplying control signals to GIP circuits and thus reducing a step height between a line pad and the signal supply pad.

Further, an aspect of the present disclosure also provides a touch screen-integrated display device in which a passivation layer is removed from a signal supply pad and control signal lines for supplying control signals to GIP circuits and thus a contact resistance between the signal supply pad and a line pad is reduced and damage to a pad connection layer is suppressed.

According to an aspect of the present disclosure, there is provided a touch screen-integrated display device, including: a substrate including an active area including a plurality of subpixels and a non-active area; a gate line and a data line to define one subpixel; a thin-film transistor disposed in the subpixel of the active area; a passivation layer disposed on the thin-film transistor and having an opening in the non-active area; a signal supply pad disposed in the opening; a line pad disposed in the opening and on a protective layer covering the signal supply pad; a pad connection layer configured to connect the line pad through at least one first contact hole and the signal supply pad through at least one second contact hole in the opening; a first electrode disposed on the passivation layer and connected to a source electrode of the thin-film transistor through a fourth contact hole, the protective layer disposed on the first electrode; a second electrode disposed on the protective layer to overlap the first electrode; and a touch sensing line parallel with the data line. Thus, it is possible to reduce a contact resistance between the signal supply pad and the line pad and also possible to suppress damage to the pad connection layer.

In a touch screen-integrated display device according to the present disclosure, contact characteristics are improved by removing a passivation layer from a signal supply pad and control signal lines for supplying control signals to GIP circuits and thus reducing a step height between a line pad and the signal supply pad.

Further, in a touch screen-integrated display device according to the present disclosure, a passivation layer is removed from a signal supply pad and control signal lines for supplying control signals to GIP circuits and thus a contact resistance between the signal supply pad and a line pad is reduced and damage to a pad connection layer is suppressed.

It is to be understood that both the foregoing general description and the following detailed description are exemplary and explanatory and are intend to provide further explanation of the disclosure as claimed.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
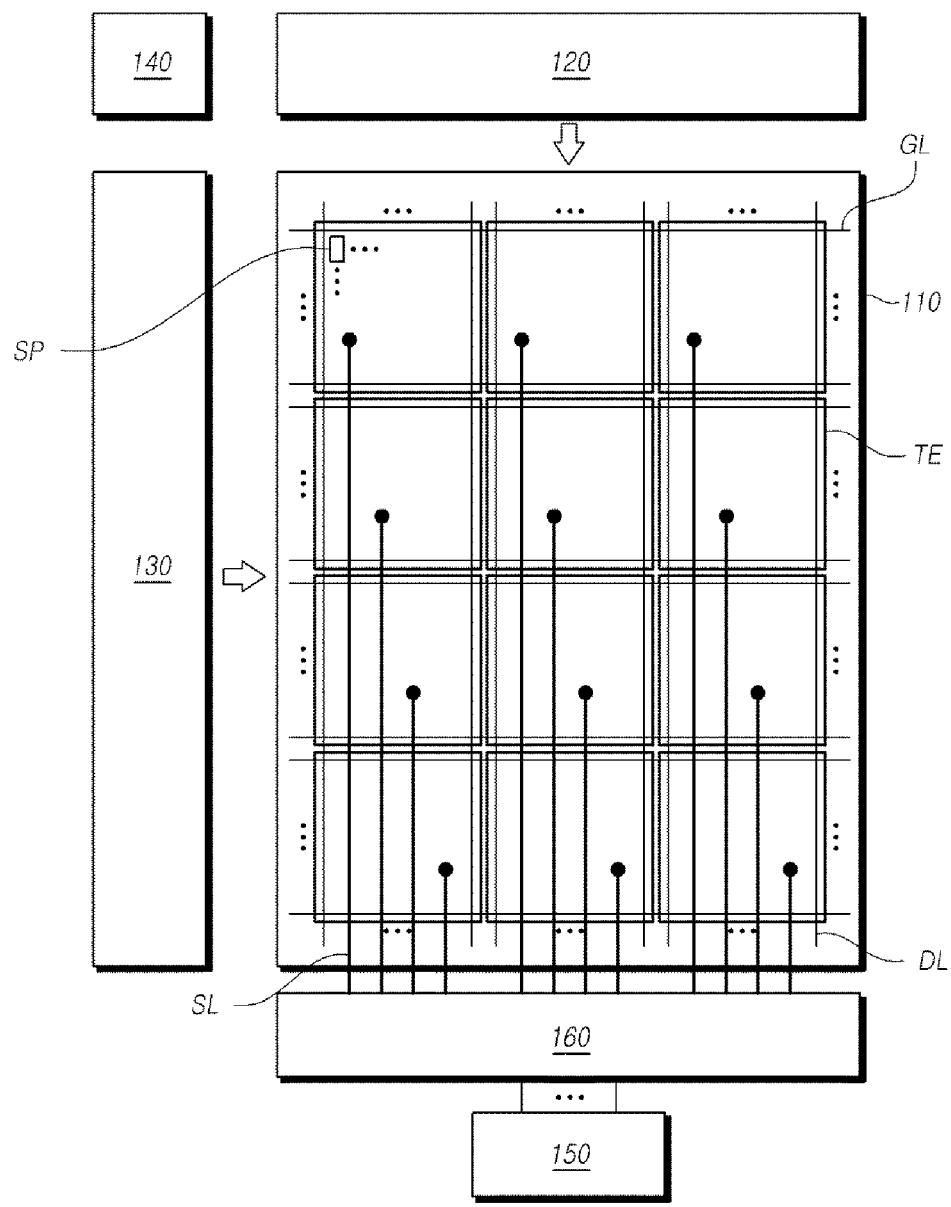
FIG. 1 is a configuration view of a touch screen-integrated display device according to the present disclosure.

Advantages and features of the present disclosure, and methods for accomplishing the same will be more clearly understood from exemplary embodiments described below with reference to the accompanying drawings. However, the present disclosure is not limited to the following exemplary embodiments but may be implemented in various different forms. The exemplary embodiments are provided only to complete disclosure of the present disclosure and to fully provide a person having ordinary skill in the art to which the present disclosure pertains with the category of the disclosure, and the present disclosure will be defined by the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the present specification. Further, in the following description, a detailed explanation of well-known related technologies may be omitted to avoid unnecessarily obscuring the subject matter of the present disclosure.

The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When the time sequence between two or more incidents is described using the terms such as "after", "subsequent to", "next to", and "before", two or more incidents may be inconsecutive unless the terms are used with the term "immediately" or "directly".

Although the terms "first", "second", and the like are used for describing various components, these components are not confined by these terms. These terms are merely used for distinguishing one component from the other components. Therefore, a first component to be mentioned below may be a second component in a technical concept of the present disclosure.

The features of various exemplary embodiments of the present disclosure can be partially or entirely bonded to or combined with each other and can be interlocked and operated in technically various ways as can be fully understood by a person having ordinary skill in the art, and the various exemplary embodiments can be carried out independently of or in association with each other.

Hereinafter, exemplary embodiments of the present disclosure will be described in detail with reference to the accompanying drawings. Also, the size and thickness of the device might be expressed to be exaggerated for the sake of convenience in the drawings. Like reference numerals generally denote like elements throughout the present specification.

FIG. 1 is a configuration view of a touch screen-integrated display device according to the present disclosure.

Referring to FIG. 1, a touch screen-integrated display device 100 according to the present disclosure is a display device capable of providing an image display function (i.e., display function) and a touch sensing function.

The touch screen-integrated display device 100 is, for example, a medium and large device, such as a TV or a monitor, or a mobile device, such as a smart phone or a tablet PC, having a touch sensing function in response to a touch input.

Referring to FIG. 1, the touch screen-integrated display device 100 includes a display panel 110, a data driver 120, a gate driver 130 and a controller 140 for providing the display function.

The display panel 110 may include a plurality of data lines DL disposed in a first direction (for example, in a column direction) and a plurality of gate lines GL disposed in a second direction (for example, in a row direction).

The data driver 120 drives the plurality of data lines DL. Herein, the data driver 120 may also be referred to as "source driver".

The gate driver 130 drives the plurality of gate lines GL. Herein, the gate driver 130 may also be referred to as "scan driver".

The controller 140 controls the data driver 120 and the gate driver 130. In order to do so, the controller 140 supplies various control signals to the data driver 120 and the gate driver 130.

The controller 140 starts a scan according to timing implemented in each frame, converts image data input from the outside to be suitable for a data signal form used by the data driver 120, outputs the converted image data, and controls a driving data at a proper time corresponding to the scan.

The controller 140 may be a timing controller used in a general display technology or a controller including the timing controller and performing additional control functions.

The gate driver 130 sequentially supplies an ON voltage or an OFF voltage scan signal to the plurality of gate lines according to the control of the controller 140.

If a specific gate line GL is opened by the gate driver 130, the data driver 120 converts the image data received from the controller 140 into a data voltage of an analog form and supplies the data voltage to the plurality of data lines DL.

The data driver 120 is located at only one side (for example, upper side or lower side) of the display panel 110 in FIG. 1, but may be located at both sides (for example, upper side and lower side) of the display panel 110 depending on the driving method or the design method of the panel.

The gate driver 130 is located at only one side (for example, left side or right side) of the display panel 110 in FIG. 1, but may be located at both sides (for example, left side and right side) of the display panel 110 depending on the driving method or the design method of the panel.

The aforementioned controller 140 receives input image data together with various timing signals, such as a vertical synchronization signal Vsync, a horizontal synchronization signal Hsync, an input data enable (DE) signal, and a clock signal CLK from the outside (for example, a host system).

The touch screen-integrated display device 100 may be any one of various devices such as a liquid crystal display device, an organic light emitting display device, and a plasma display device. For example, the touch screen-integrated display device 100 may be an in-plane switching (IPS) mode liquid crystal display device in which liquid crystal molecules are aligned horizontally and rotated in place to display an image, and has advantages of high resolution, low power consumption, wide viewing angle, and the like. More specifically, the touch screen-integrated display device 100 may be an advanced high performance-IPS (AH-IPS) mode liquid crystal display device.

Each subpixel SP disposed in the display panel 110 may be configured to include various circuit elements such as a transistor.

Meanwhile, the touch screen-integrated display device 100 may include a touch system for providing the touch sensing function.

Referring to FIG. 1, the touch system may include a plurality of touch electrodes TE functioning as touch sensors and a touch circuit 150 configured to sense a touch input by driving the plurality of touch electrodes TE.

The touch circuit 150 sequentially supplies a touch drive signal to the plurality of touch electrodes TE to sequentially drive the plurality of touch electrodes TE.

Then, the touch circuit 150 receives a touch sensing signal from a touch electrode TE to which the touch drive signal is applied.

The touch circuit 150 may identify a touch or a non-touch and calculate touch coordinates on the basis of touch sensing signals received from the plurality of touch electrodes TE.

Herein, the touch drive signal may have, for example, a waveform of a pulse-modulated signal having two or more voltage levels.

The touch sensing signals received from the plurality of touch electrodes TE may vary depending on whether or not a touch is input by an object such as a finger or a pen around the corresponding touch electrodes TE.

The touch circuit 150 may identify a touch or a non-touch and obtain touch coordinates by obtaining a capacitance variation (or voltage variation or charge variation) in the touch electrodes TE on the basis of the touch sensing signals.

Referring to FIG. 1, each of the touch electrodes TE is connected to a sensing line SL in order to supply a touch drive signal to each of the plurality of touch electrodes TE.

Further, in order to sequentially supply a touch drive signal to the plurality of touch electrodes TE, the touch system may further include a switch circuit 160 configured to sequentially connect the touch circuit 150 to the sensing lines SL respectively connected to the plurality of touch electrodes TE.

The switch circuit 160 may include at least one multiplexer.

Meanwhile, referring to FIG. 1, each of the plurality of touch electrodes TE may be formed into a block shape.

Further, each touch electrode TE may have a size equal or corresponding to a size of one subpixel area SP.

Otherwise, each touch electrode TE may have a size greater than a size of one subpixel area SP as illustrated in FIG. 1.

That is, each touch electrode TE area may have a size corresponding to a size of two or more subpixel areas SP.

Meanwhile, referring to FIG. 1, the plurality of touch electrodes TE may be built in the display panel 110.

In this sense, it can be said that the display panel 110 may be integrated with a touch screen or a touch screen panel. That is, the display panel 110 may be an in-cell or on-cell touch screen-integrated display panel.

Meanwhile, the touch screen-integrated display device 100 may operate in a display mode in order to provide the display function, or may operate in a touch mode in order to provide the touch sensing function.

In this regard, the plurality of touch electrodes TE may operate as touch sensors during the touch mode, and may be used as display mode electrodes during the display mode.

For example, during the display mode, the plurality of touch electrodes TE may operate as common electrodes to which a common voltage Vcom is applied, as an example of a display mode electrode.

Herein, the common voltage Vcom corresponds to a pixel voltage to be applied to a pixel electrode.

Meanwhile, the plurality of touch electrodes TE built in the display panel 110 may be disposed in a matrix of N (N≥2) number of rows and M (M≥2) number of columns, as illustrated in FIG. 1.

Figure 2:
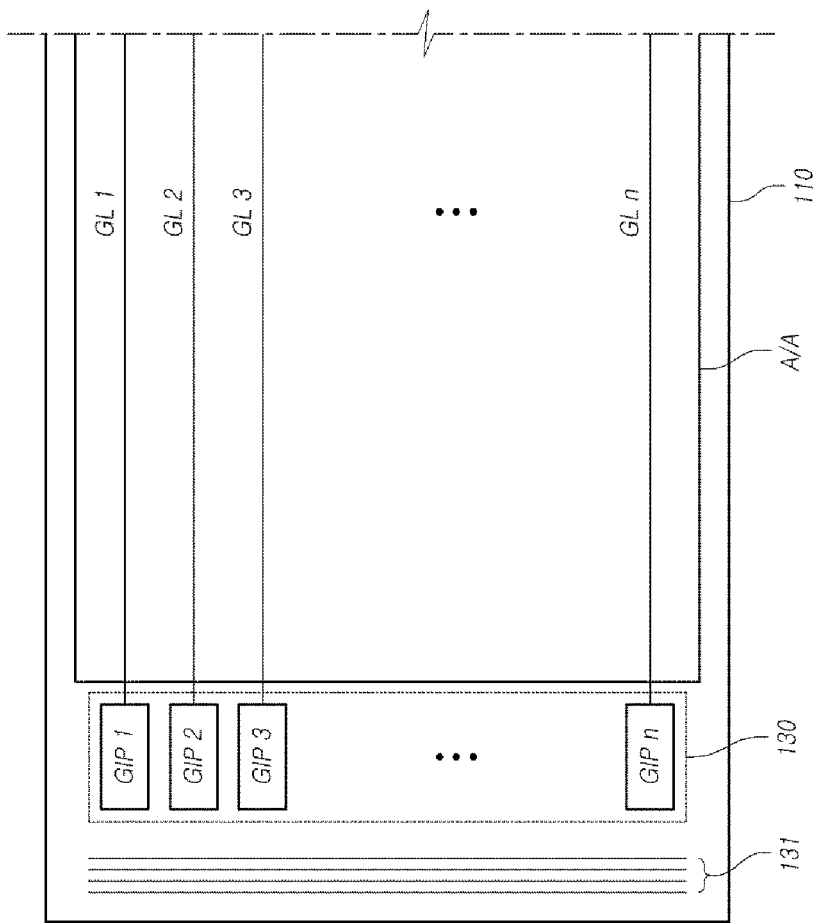
FIG. 2 is an exemplary diagram of a gate driver of a touch screen-integrated display device according to the present disclosure.

FIG. 2 is an exemplary diagram of a gate driver of the touch screen-integrated display device according to the present disclosure.

In the following, for the purpose of convenience, one or more gate driver integrated circuits included in the gate driver 130 will be described as being assumed to be of a GIP type, and the gate driver integrated circuit may also be described as "GIP (Gate Driver IC in Panel)".

In this case, as illustrated in the exemplary diagram of the gate driver 130 in FIG. 2, a plurality of gate driver integrated circuits GIP 1, GIP 2, . . . , GIP n may be disposed in a non-active area as an outer circumference of an active area A/A of the display panel 110 where an image is displayed.

Figure 4:
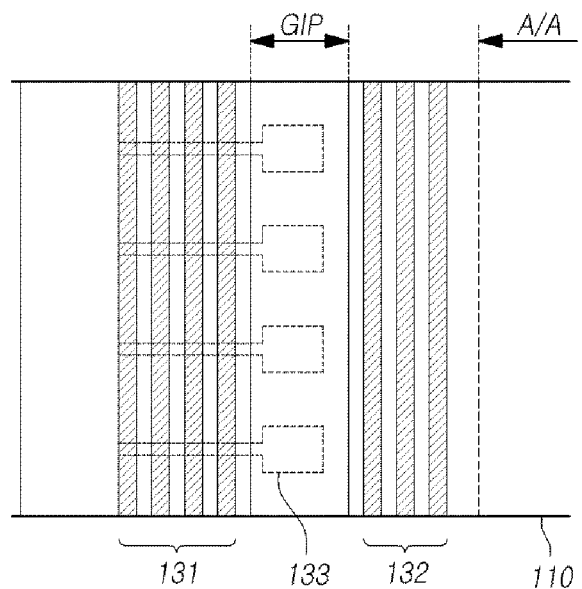
FIG. 4 is a diagram illustrating a GIP circuit area of the touch screen-integrated display device according to the present disclosure.

Further, a plurality of control signal lines 131 is disposed adjacent to the gate driver 130 and electrically connected to a plurality of GIP circuits disposed in a gate driver integrated circuit (shown in FIG. 4).

FIG. 2 illustrates that the gate driver integrated circuits are provided in the same number as the number n of the gate lines GL. However, the number (for example, 2n) of the gate driver integrated circuits may be different from the number n of the gate lines GL depending on the driving method of the gate driver 130.

If a specific gate line is opened, the data driver 120 converts the image data received from the controller 140 into a data voltage of an analog form and supplies the data voltage to each of the plurality of data lines DL to drive the data lines DL.

Figure 3:
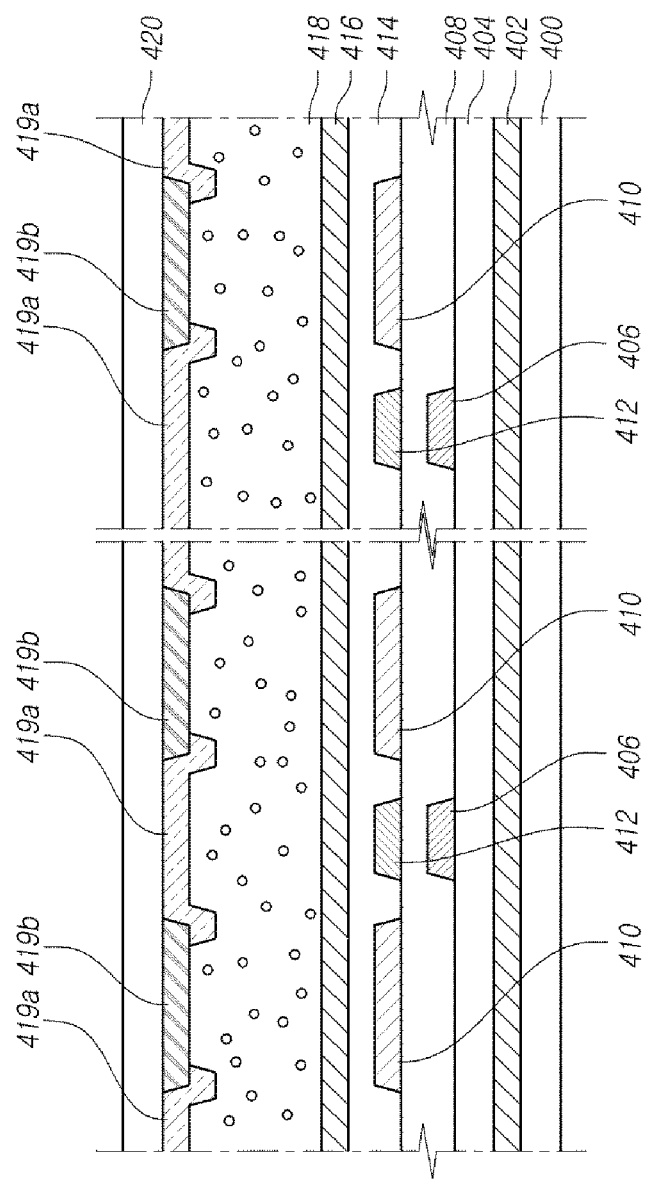
FIG. 3 is a diagram illustrating a cross-section of a display panel in a case where a touch screen-integrated display device according to an exemplary embodiment of the present disclosure is a liquid crystal display device.

FIG. 3 is a diagram illustrating a cross-section of a display panel in a case where the touch screen-integrated display device according to an exemplary embodiment of the present disclosure is a liquid crystal display device.

Referring to FIG. 3, in the display panel 110 of the touch screen-integrated display device 100, for example, a gate line 402 is formed in a first direction (in a horizontal direction in FIG. 1) on a lower substrate 400, and a gate insulation layer (gate insulator) 404 is formed thereon.

A data line 406 is formed in a second direction (in a vertical direction in FIG. 1) on the gate insulation layer 404, and a first protective layer 408 is formed thereon.

Pixel electrodes 410 of each subpixel area and sensing lines 412 are formed on the first protective layer 408, and a second protective layer 414 may be formed thereon. Herein, the sensing lines 412 are respectively connected from the plurality of touch electrodes TE functioning as the common electrodes and the touch electrodes to the switch circuit 160 to transfer a common voltage Vcom generated from the common voltage supply unit to the plurality of touch electrodes TE in the display mode and a touch drive signal generated from the touch circuit 150 and the switch circuit 160 to the plurality of touch electrodes TE in the touch mode.

One electrode 416 functioning as a common electrode and a touch electrode is formed on the second protective layer 414, and a liquid crystal layer 418 is formed thereon. Herein, the electrode 416 functioning as the common electrode and the touch electrode is one of the plurality of touch electrodes TE and may be a block-shaped pattern.

An upper substrate 420 on which a black matrix 419a, a color filter 419b, and the like, are to be formed is positioned on the liquid crystal layer 418.

Although FIG. 3 illustrates the liquid crystal display device, the present disclosure is not limited thereto and can be applied to various display devices which can be integrated with a touch panel.

FIG. 4 is a diagram illustrating a GIP circuit area of the touch screen-integrated display device according to the present disclosure.

Referring to FIG. 4, a gate driver integrated circuit GIP is disposed on the display panel 110 of the touch screen-integrated display device according to the present disclosure. Further, a GIP circuit 133 including a plurality of thin-film transistors is disposed on the gate driver integrated circuit GIP so as to function as a shift register.

Further, the plurality of control signal lines 131 is disposed in one side area of the GIP circuit 133, and common lines 132 are disposed between the GIP circuit 133 and the active area A/A.

As illustrated in the drawing, the GIP circuits 133 are electrically connected to the control signal lines 131, and may be connected in a jumping structure by connection patterns patterned when the common electrode (or touch electrode) is formed.

Particularly, a touch sensing line (or sensing line) is added in the touch screen-integrated display device according to the present disclosure. In this case, the control signal lines 131 are formed on the passivation layer.

The control signal lines 131 are used as lines for supplying a clock signal CLK or the like to the GIP circuit 133. The clock signal CLK is output by generating a gate signal (scan signal) to be supplied to the gate lines from the GIP circuit 133.

Further, the clock signal CLK supplied to the control signal lines 131 is transferred from a signal supply pad formed on a substrate. Therefore, a line pad is formed on one side edge of the control signal line 131 and connected to the signal supply pad.

The line pad disposed on the passivation layer and the signal supply pad disposed on the substrate are connected by a pad connection layer through a contact hole formed on the passivation layer so as to expose the signal supply pad.

However, a great thickness of the passivation layer can cause a great step height with respect to the contact hole area. Thus, the pad connection layer configured to electrically connect the line pad and the signal supply pad can be disconnected or a crack can be generated.

Figure 5:
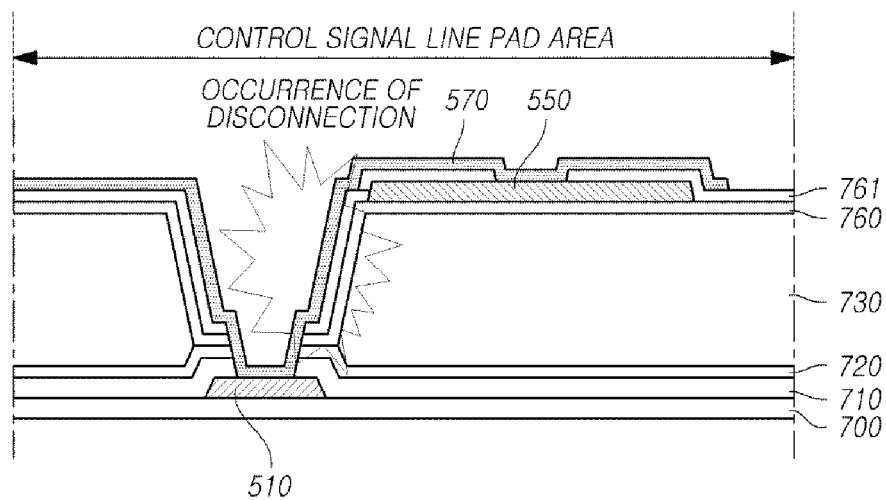
FIG. 5 is a diagram illustrating a disconnection defect occurring between a control signal line pad and a signal supply pad in the touch screen-integrated display device.

FIG. 5 is a diagram illustrating a disconnection defect occurring between a control signal line pad and a signal supply pad in the touch screen-integrated display device.

Referring to FIG. 5 together with FIG. 4, the control signal lines 131 disposed in the non-active area of the display panel 110 and line pads 550 formed on their ends are formed on a passivation layer 730.

Thus, the line pad 550 disposed on the control signal line pad area is disposed on a gate insulation layer 710, a first protective layer 720, the passivation layer 730, and a second protective layer 720 laminated on a substrate 700. A reference numeral 761 in the drawing denotes a third protective layer.

As illustrated in the drawing, a signal supply pad 510 is disposed on the substrate 700. Thus, there is a great step height between the line pad 550 and the signal supply pad 510 in the contact hole area through which the signal supply pad 510 is exposed.

Therefore, the pad connection layer 570 configured to connect the signal supply pad 510 and the line pad 550 is disposed along the steep slope of the passivation layer 730. Thus, a crack or a disconnection can occur while the display device is driven.

In the touch screen-integrated display device according to the present disclosure, a part of the passivation layer is removed from a control signal line area, and the signal supply pad is spaced away from the control signal line with a gate insulation layer interposed therebetween. Thus, a step height between the line pad and the signal supply pad can be reduced.

Further, in the touch screen-integrated display device according to the present disclosure, a part of the passivation layer is removed for placing the signal supply pad and the line pad of the control signal lines for supplying control signals to GIP circuits, so a contact resistance between the signal supply pad and a line pad is reduced and damage to a pad connection layer can be suppressed.

In the following, the touch screen-integrated display device according to the present disclosure is described. However, the present disclosure can also be applied to an in-plane switching (IPS) mode liquid crystal display device or an advanced high performance-IPS (AH-IPS) mode liquid crystal display device.

In case of the IPS mode liquid crystal display device, the common electrode has an electrode structure which is not divided into block shapes like the touch electrode but is formed as one body at the entire area of the display panel. The common electrode is patterned into a comb teeth shape or a slit shape in an area corresponding to each subpixel area and functions as a common electrode, and a pixel electrode is patterned into a plate shape, but the present disclosure is not limited thereto. In other embodiments, the common electrode can be patterned into a plate shape, and the pixel electrode can be patterned into a comb teeth shape or a slit shape.

Figure 6:
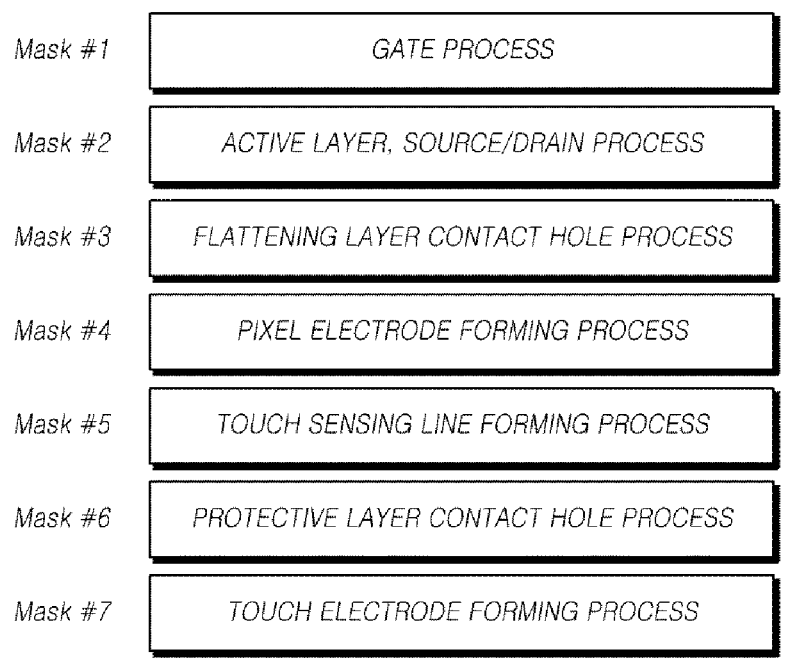
FIG. 6 is a flowchart illustrating a process of manufacturing the touch screen-integrated display device according to the present disclosure.

FIG. 6 is a flowchart illustrating a process of manufacturing the touch screen-integrated display device according to the present disclosure.

Referring to FIG. 6, the process of manufacturing the touch screen-integrated display device according to the present disclosure includes: providing a substrate divided into an active area A/A where an image is displayed and a non-active area disposed outside the active area A/A along the circumference of the active area A/A; and forming a gate line, a gate electrode of a thin-film transistor, and a gate pad. Further, in the present disclosure, a signal supply pad for supplying a clock signal CLK to control signal lines connected to GIP circuits of a gate driver is formed on the substrate at the same time (first mask process (Mask #1)).

Then, a second mask process (Mask #2) for forming an active layer, a source electrode, and a drain electrode of a thin-film transistor disposed on each subpixel of the active area is performed. A first protective layer and a passivation layer are formed on the substrate in order to protect the thin-film transistor. Then, a third mask process (Mask #3) is performed onto the passivation layer to form a contact hole in order to expose the source electrode or the drain electrode.

In the second mask process, a diffraction mask or a halftone mask is used to form the source electrode, the drain electrode, and the active layer at the same time.

Further, in the present disclosure, a part of the passivation layer is removed, so there will be an area where a control signal line and a signal supply pad will be formed so that the area where a gate insulation layer is exposed is formed together.

Then, a fourth mask process (Mask #4) for forming a pixel electrode (first electrode) and a fifth mask process (Mask #5) for forming a second protective layer, a touch sensing line, a control signal line, and a line pad are performed to each subpixel. In this case, the control signal pad and the line pad are formed on the opening and thus formed on the second protective layer formed on the gate insulation layer.

Then, a third protective layer is formed on the entire surface of the substrate, and a contact hole process is performed for exposing the touch sensing line, a part of the pixel electrode, the line pad, and the signal supply pad by performing a sixth mask process (Mask #6).

Then, a seventh mask process (Mask #7) is performed to form a touch electrode (common electrode) to be disposed on the pixel electrode with the third protective layer interposed therebetween.

In this case, a pad connection layer for connecting the line pad and the signal supply pad is formed on the control signal line pad area at the same time.

In the present disclosure, the control signal line and the line pad are formed on the gate insulation layer from which the passivation layer is removed. Thus, a step height with respect to the signal supply pad can be reduced to suppress deterioration in image quality.

Figure 7:
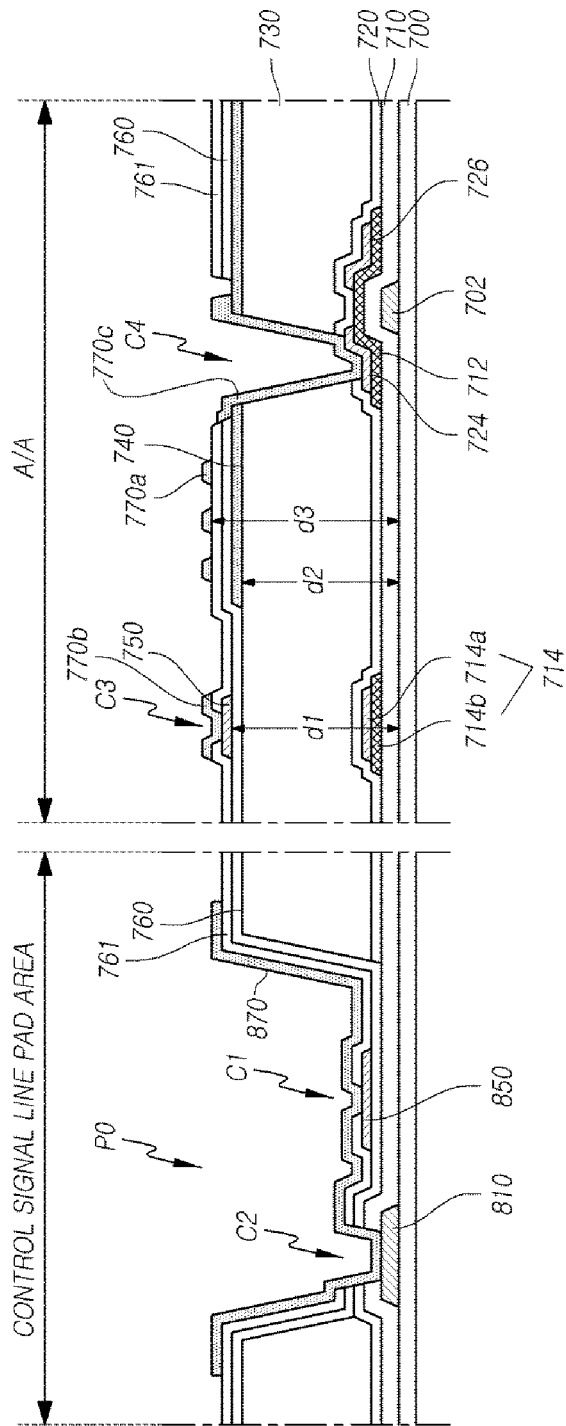
FIG. 7 is a cross-sectional view of a subpixel area and a control signal line pad area in the touch screen-integrated display device according to the present disclosure.
Figure 8:
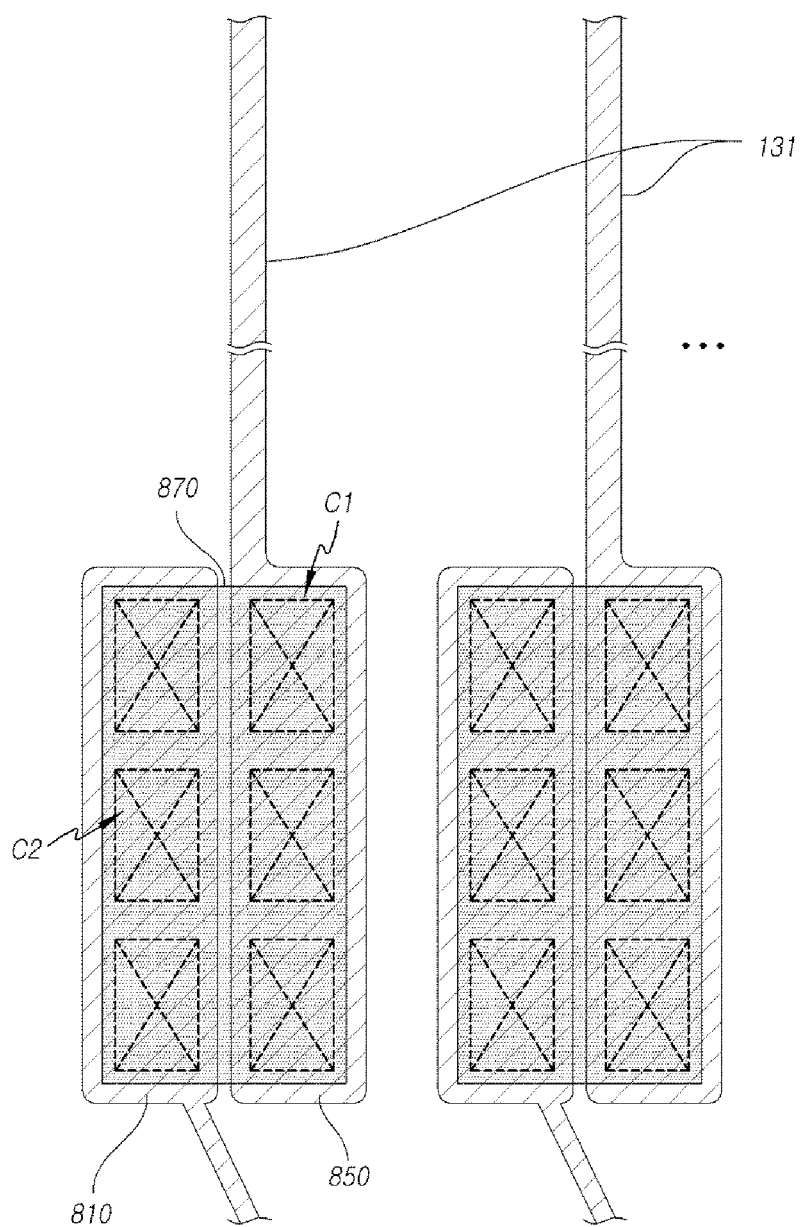
FIG. 8 is a plane view of the control signal line pad and a signal supply pad of the touch screen-integrated display device according to the present disclosure.

FIG. 7 is a cross-sectional view of a subpixel area and a control signal line pad area in a touch screen-integrated display device according to the present disclosure, and FIG. 8 is a plane view of the control signal line pad and a signal supply pad of the touch screen-integrated display device according to the present disclosure.

Referring to FIG. 7, the touch screen-integrated display device of the present disclosure are described focusing on an active area where a plurality of subpixels is disposed and a control signal line pad area as an outer area (i.e., non-active area) of the active area.

The control signal line pad area may be any one of both terminal ends where the control signal lines 131 are disposed in FIG. 2. Further, it is assumed that the touch screen-integrated display device of the present disclosure has a GIP structure in which the gate driver 130 is built in the display panel 110.

In the active area of the touch screen-integrated display device of the present disclosure, a gate electrode 702 is disposed on the substrate 700, and a thin-film transistor including the gate insulation layer 710, an active layer 712, a source electrode 724, and a drain electrode 726 is disposed on the gate electrode 702. The source electrode and the drain electrode may be switched to each other.

The gate electrode 702 may be formed of double metal patterns or a plurality of metal patterns. Further, the metal patterns may have a structure in which a conductive metal pattern and a transparent conductive material pattern are mixed.

For example, the conductive metal pattern may be formed of a conductive metal such as aluminum (Al), tungsten (W), copper (Cu), molybdenum (Mo), chromium (Cr), titanium (Ti), molytungsten (MoW), molytitanium (MoTi), and copper/molytitanium (Cu/MoTi), but is not limited thereto. Further, the transparent conductive material pattern may be formed of one of ITO (Indium Tin Oxide), IZO (Indium Zinc Oxide), and CNT (Carbon Nano Tube), but is not limited thereto.

Further, a data line 714 is disposed on the gate insulation layer 710. The data line 714 may be formed of double patterns including a first data line pattern 714a and a second data line pattern 714b. The first data line pattern 714a may include a plurality of metal patterns. Further, the metal patterns may have the above-described structure in which a conductive metal pattern and a transparent conductive material pattern are mixed.

The second data line pattern 714b may be formed of the same material as the active layer 712 since the source electrode 724, the drain electrode 726 and the active layer 712 are formed by a single mask process in the present disclosure.

The first protective layer 720 and the passivation layer 730 are disposed on the thin-film transistor and the data line 714. In the source electrode area 724 of the thin-film transistor, a contact hole C4 is formed. The passivation layer 730 may be an overcoating layer formed of an organic film material.

Further, a first electrode 740 and a second electrode 770a are disposed to be overlapped with each other with second and third protective layers 760 and 761 interposed therebetween on the passivation layer 730. In the contact hole C4, a connection pattern 770c formed of the same material as the second electrode 770a and configured to electrically connect the first electrode 740 and the source electrode 724 is disposed.

The second electrode 770a is an electrode functioning as a common electrode in a display mode or also functioning as a touch electrode in a touch mode.

Further, a touch sensing line 750 is disposed on the second protective layer 760 on the passivation layer 730 overlapped the data line 714. The touch sensing line 750 is in parallel with the data line 714. The third protective layer 761 is formed on the touch sensing line 750. The touch sensing line 750 is exposed to the outside through a contact hole C3 where the third protective layer 761 is partially removed, and a touch connection layer 770b is electrically connected to the touch sensing line 750 through the contact hole C3.

Further, in the non-active area, a gate driver including GIP circuits is disposed, and as illustrated in FIG. 2, the control signal lines 131 are disposed adjacent to the GIP circuits.

The control signal lines 131 are formed of the same material as the touch sensing line 750 at the same time. Particularly, in the present disclosure, an opening PO is formed by removing a part of the passivation layer 730 on the control signal lines 131 and the control signal line pad area. The opening PO is formed by removing all of the passivation layer 730 when a contact hole C1 is formed.

Referring to FIG. 8 together with FIG. 7, in the control signal line pad area, a signal supply pad 810 supplied with a signal such as a clock signal CLK from an external system is disposed on the substrate 700 and the gate insulation layer 710 is formed on the signal supply pad 810.

In the opening PO, the passivation layer 730 and the first protective layer 720 formed in the non-active area are removed, and the second protective layer 760 is formed on the gate insulation layer 710.

Therefore, the control signal lines 131 and a line pad 850 are disposed on the second protective layer 760 in the opening PO, and the gate insulation layer 710 and the second protective layer 760 are presented between the signal supply pad 810 and the line pad 850.

Referring to FIG. 8, the line pad 850 is formed as one body with each of the control signal lines 131 on the display panel, and the line pad 850 is electrically connected to the signal supply pad 810 by a pad connection layer 870.

The line pad 850 formed as one body with each of the control signal lines 131 is exposed to the outside through a contact hole C1 where the third protective layer 761 is partially removed. The signal supply pad 810 is exposed through a contact hole C2 where the gate insulation layer 710, the second protective layer 760, and the third protective layer 761 are partially removed.

The pad connection layer 870 is electrically connected to the signal supply pad 810 and the line pad 850 through the contact hole C1 and the contact hole C2. Therefore, if a clock signal CLK or the like is supplied to the signal supply pad 810 from the external system, the clock signal CLK is supplied to the control signal lines 131 through the pad connection layer 870 and the line pad 850.

In the present disclosure, a part of the passivation layer 730 is removed to reduce a step height between the signal supply pad 810 and the line pad 850 on the control signal line 131 so that the signal supply pad 810 and the line pad 850 can be disposed adjacent to each other.

Therefore, a distance between the signal supply pad 810 and the line pad 850 is decreased. Thus, a contact resistance of the pad connection layer 870 can be reduced.

Further, in the present disclosure, a contact distance of the pad connection layer 870 is decreased. Thus, a contact resistance of the pad connection layer 870 can be reduced. Further, a step height between the signal supply pad 810 and the line pad 850 is decreased. Thus, a crack or a disconnection defect of the pad connection layer 870 can be suppressed.

FIG. 9A through FIG. 9G are cross-sectional views illustrating a process of manufacturing the touch screen-integrated display device according to the present disclosure.

The touch screen-integrated display device of the present disclosure is divided into the active area A/A where a plurality of subpixels is formed to display an image and the non-active area. The non-active area may include an area where a gate pad area, a data pad area, a gate driver, a control signal line, and a common line are disposed.

In FIG. 9A through FIG. 9G, a subpixel area of the active area A/A and a control signal line pad area in the display area are described.

Figure 9A:
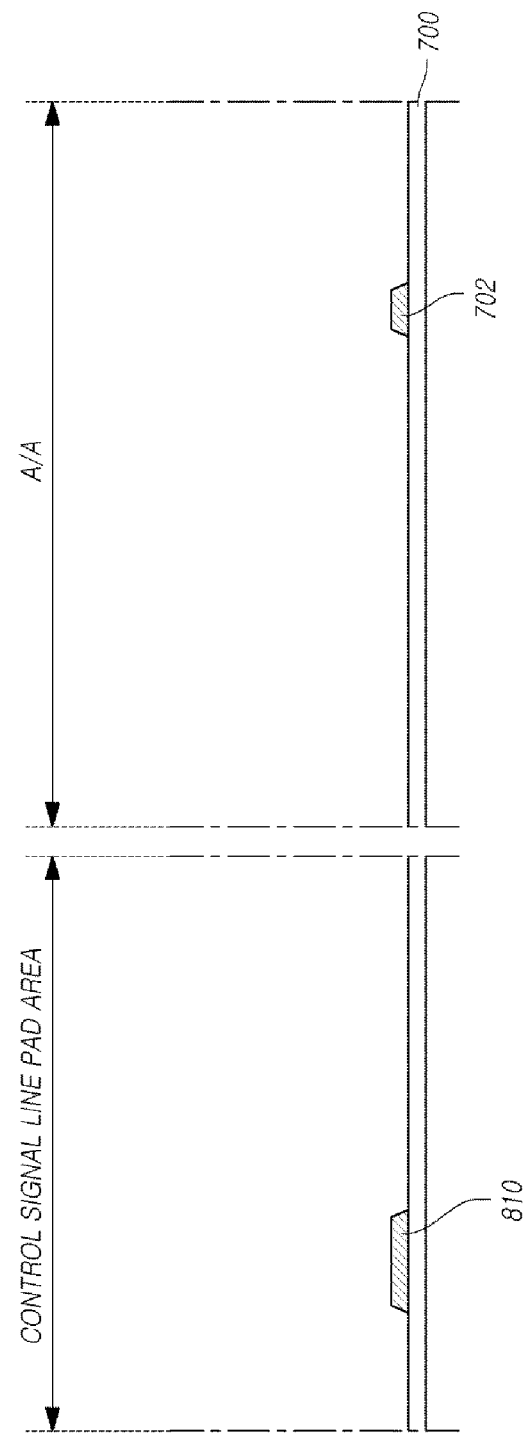
FIG. 9A through FIG. 9G are cross-sectional views illustrating a process of manufacturing the touch screen-integrated display device according to the present disclosure.

Referring to FIG. 9A, a gate metal film is formed on the substrate 700 divided into the active area A/A and the non-active area as an outer circumference of an active area A/A. Then, the gate electrode 702 and a gate line (not illustrated) are formed through the first mask process (Mask #1). At the same time, a gate pad (not illustrated) is formed in the gate pad area. Further, the signal supply pad 810 is formed in the control signal line pad area. The signal supply pad 810 and the gate line GL are formed of the same material.

The gate metal film may be formed by laminating at least two or more metal layers, and may have a structure in which a metal layer and a transparent conductive material layer are laminated. Therefore, the metal layer may be formed of a conductive metal such as aluminum (Al), tungsten (W), copper (Cu), molybdenum (Mo), chromium (Cr), titanium (Ti), molytungsten (MoW), molytitanium (MoTi), and copper/molytitanium (Cu/MoTi), but is not limited thereto.

Further, the transparent conductive material layer may be formed of one of ITO (Indium Tin Oxide), IZO (Indium Zinc Oxide), and CNT (Carbon Nano Tube), but is not limited thereto. The gate metal film is not limited to the double metal layer, but may be formed into a single metal layer.

Figure 9B:
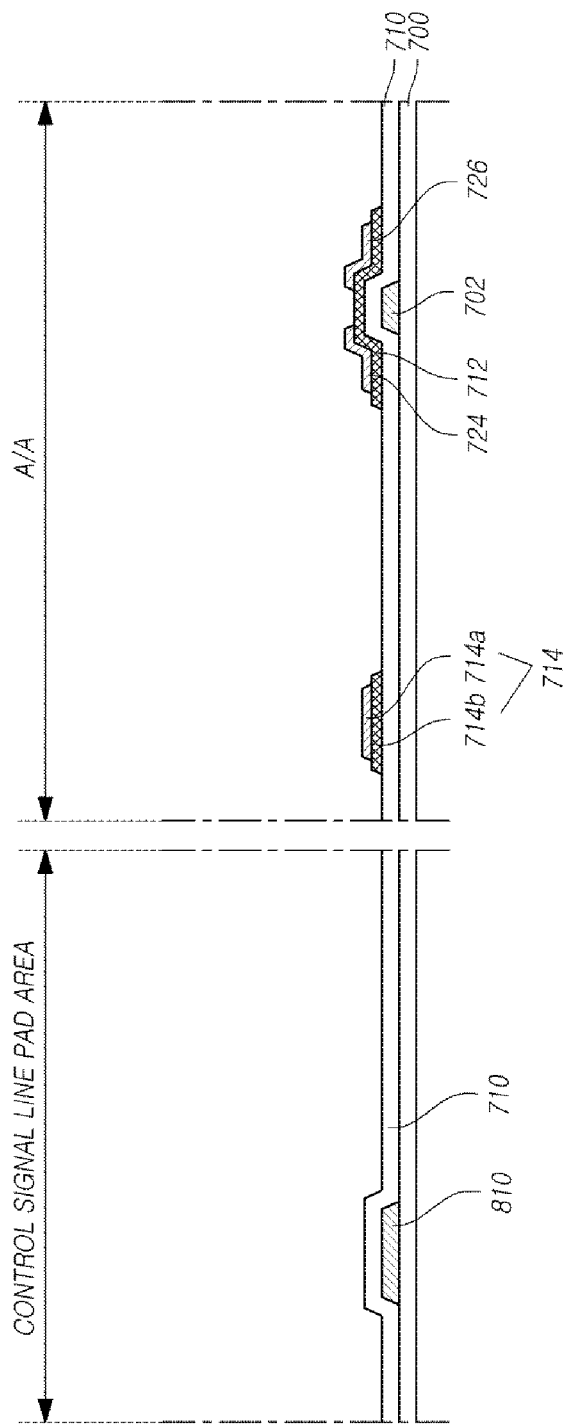

As described above, if the gate electrode 702, and the like, is formed on the substrate 700, the gate insulation layer 710 is formed on the entire surface of the substrate 700 as illustrated in FIG. 9B. The gate insulation layer 710 is disposed on the signal supply pad 810 and the gate line GL. Then, a semiconductor layer and a source/drain metal film may be consecutively formed.

The semiconductor layer may be formed of a semiconductor material such as amorphous silicon or polysilicon such as LTPS, HTPS, or the like. Further, the semiconductor layer may be formed using a semiconductor oxide material such as zinc oxide (ZO), indium gallium zinc oxide (IGZO), zinc indium oxide (ZIO), and Ga-doped ZnO (ZGO).

Then, the active layer 712, the source electrode 724, and the drain electrode 726 are formed on the gate insulation layer 710 corresponding to the gate electrode 702 through the second mask process (Mask #2) using a diffraction mask or a halftone mask. A thin-film transistor includes the gate electrode 702, the gate insulation layer 710, the active layer 712, the source electrode 724, and the drain electrode 726.

Further, at the same time, a data pad (not illustrated) is formed on the data line 714 and a data pad area.

Figure 9C:
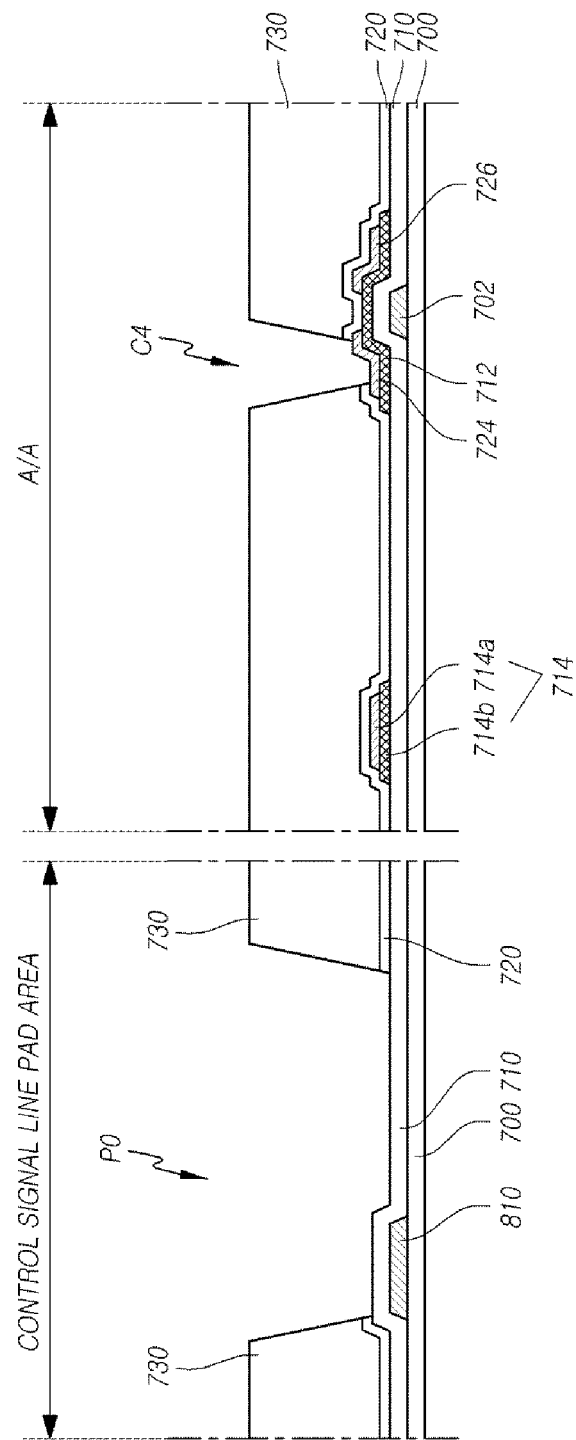

Then, as illustrated in FIG. 9C, the first protective layer 720 and the passivation layer 730 are formed in sequence on the entire surface of the substrate 700. Then, the contact hole C4 which exposes a part of the source electrode 724 is formed through the third mask process (Mask #3).

Further, the opening PO is formed in the control signal line pad area by removing a part of the passivation layer 730 and the first protective layer 720 to from an area where control signal lines and a line pad will be formed. Therefore, in the opening PO, the gate insulation layer 710 is exposed to the outside.

The first protective layer 720 may be formed of an inorganic material such as SiO2 and SiNx, or an organic material such as photo acryl, but the present disclosure is not limited thereto.

Further, the passivation layer 730 may be formed into an overcoating layer of an organic material.

Figure 9D:
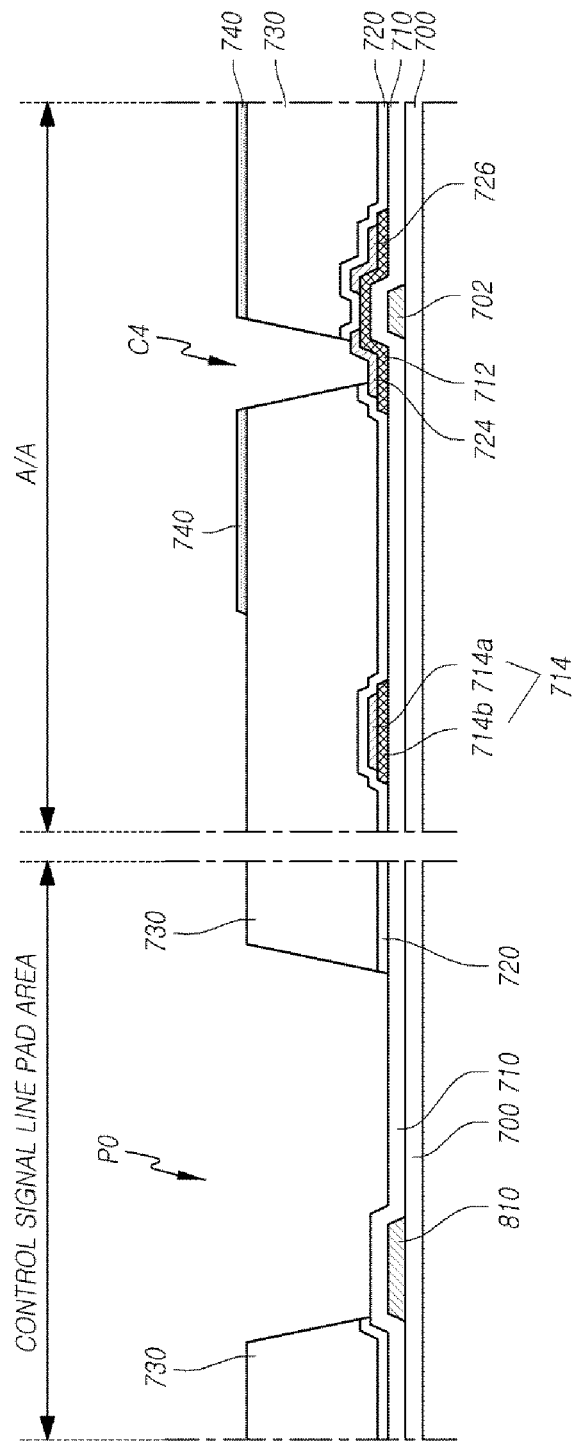

If the contact hole C4 is formed on the passivation layer 730, a metal layer is formed on the entire surface of the substrate 700 as illustrated in FIG. 9D. Then, the first electrode (pixel electrode) 740 is formed on the passivation layer 730 through the fourth mask process (Mask #4) The first electrode 740 may be formed of any one of a transparent conductive material such as ITO (Indium Tin Oxide), IZO (Indium Zinc Oxide), and CNT (Carbon Nano Tube).

Figure 9E:
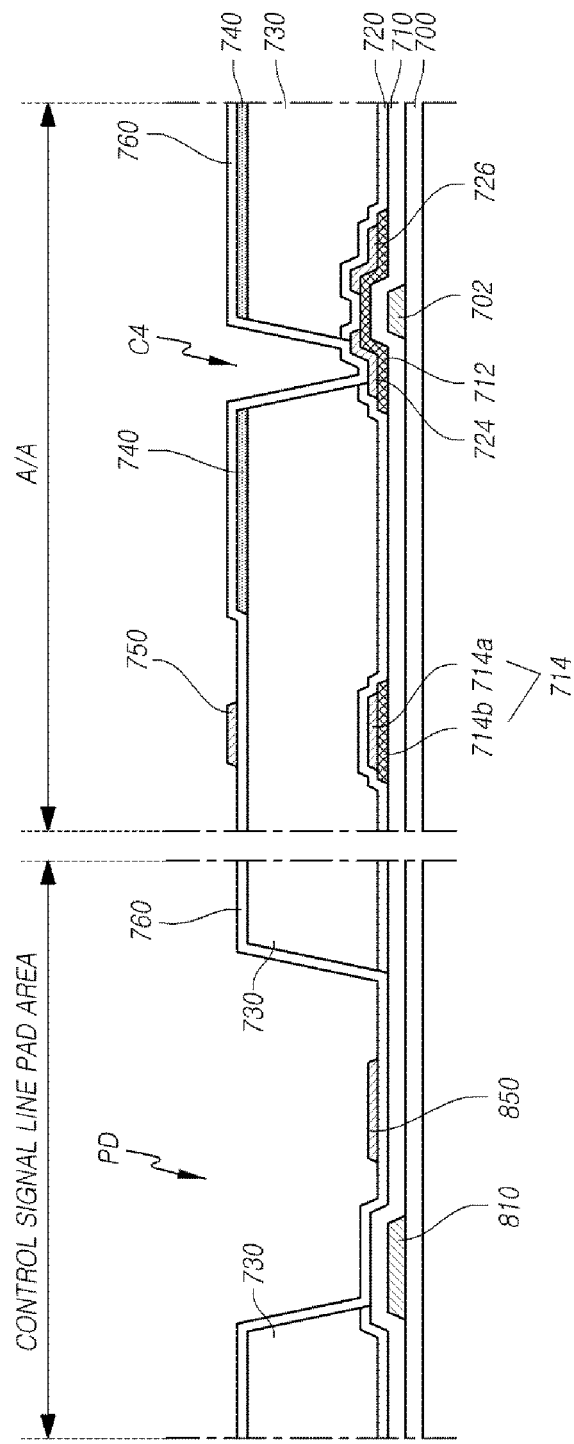

If the first electrode 740 is formed on the passivation layer 730 as described above, the second protective layer 760 is formed on the entire surface of the substrate 700 and a metal layer is formed as illustrated in FIG. 9E. Then, the touch sensing line 750 is formed on the passivation layer 730 overlapped the data line 714 through the fifth mask process (Mask #5).

Further, in the control signal line pad area, control signal lines (not illustrated) and the line pad 850 are formed on the second protective layer 760 formed in the opening PO. The touch sensing line 750 and the line pad 850 are formed of the same material.

Figure 9F:
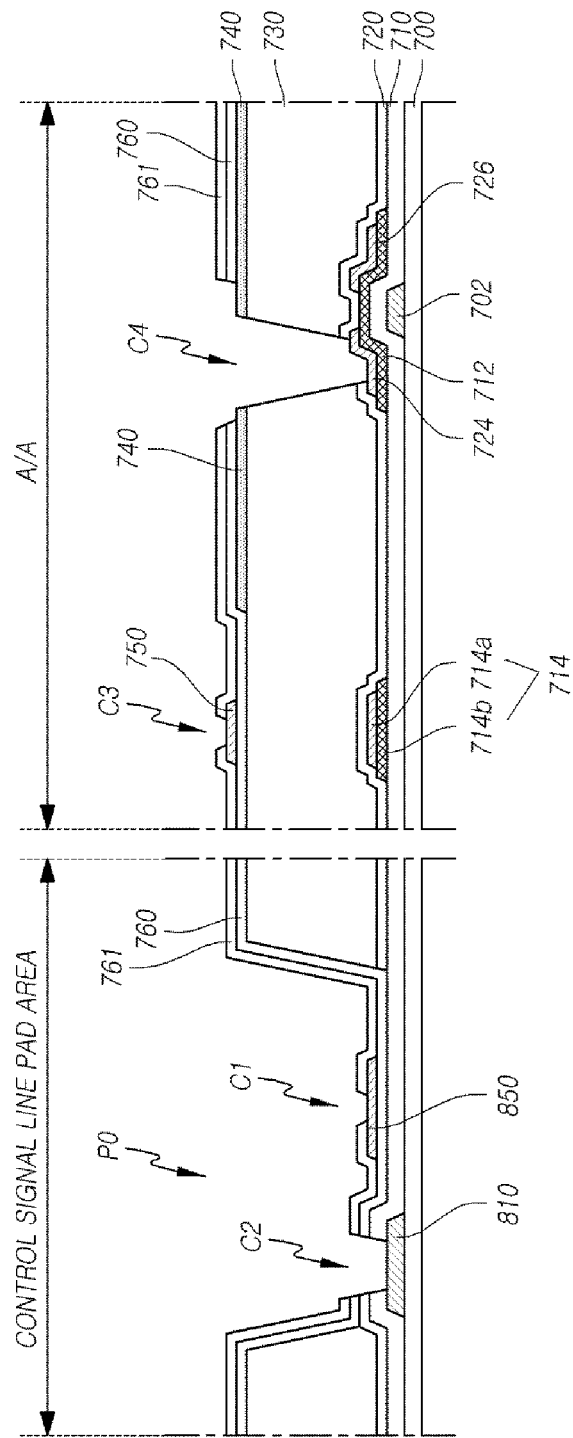

If the touch sensing line 750 is formed on the second protective layer 760 as described above, the third protective layer 761 is formed on the entire surface of the substrate 700 as illustrated in FIG. 9F. Then, the contact holes C1, C2 and C4 are formed through the sixth mask process (Mask #6).

A part of the touch sensing line 750 is exposed through the contact hole C4, a part of the line pad 850 is exposed through the contact hole C1, and a part of the signal supply pad 810 is exposed through the contact hole C2.

Figure 9G:
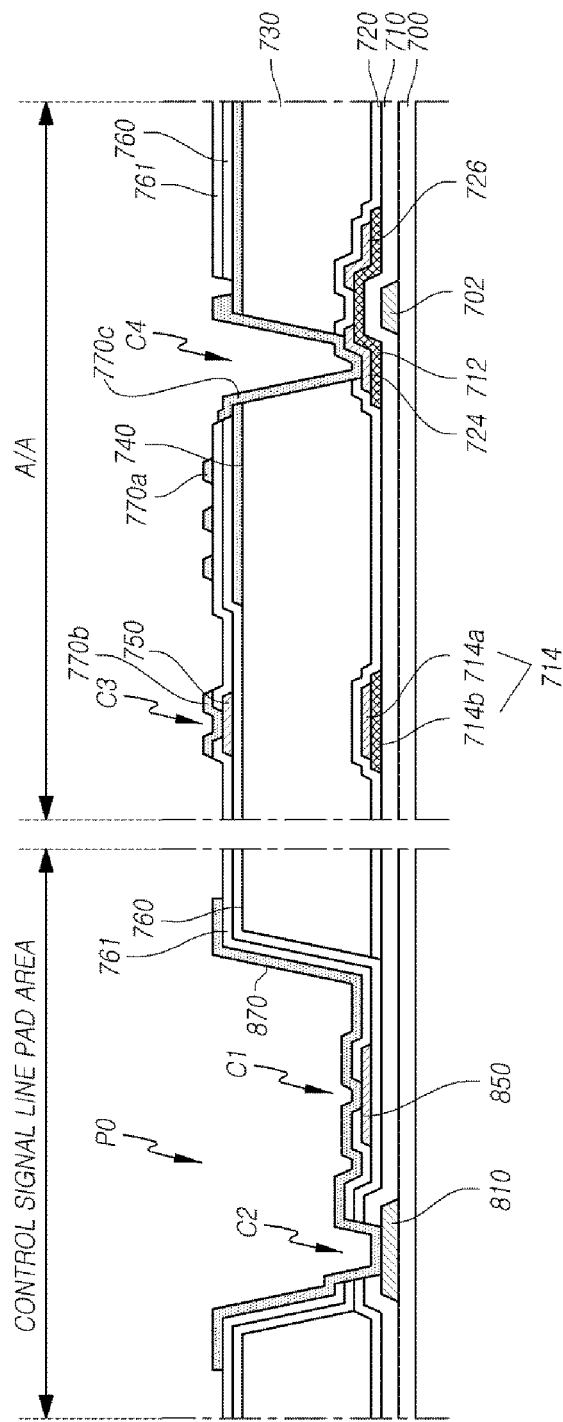

If the contact holes C1, C2, and C4 are formed as described above, a transparent conductive material layer is formed on the entire surface of the substrate 700 as illustrated in FIG. 9G. In addition, the present disclosure is not limited to the quantities of the contact holes C1 to C4. In other embodiments, the quantity of each contact holes C1 to C4 can be plural. Then, the second electrode (common electrode or touch electrode) 770a overlapped the first electrode 740 is formed through the seventh mask process (Mask #7). In addition, a distance between the substrate 700 and the touch sensing line 750 is d1, a distance between the substrate 700 and the first electrode 740 is d2, a distance between the substrate 700 and the second electrode 770a is d3, and d3>d1>d2. That is, the distances from the substrate 700 to the touch sensing line 750, the first electrode 740 and the second electrode 770a are different from one another.

Further, in the contact hole C4, the connection pattern 770c for electrically connecting the first electrode 740 and the source electrode 724 is formed. In the contact hole C3, the touch connection layer 770b electrically connected to the touch sensing line 750 is formed.

Furthermore, in the control signal line pad area, the pad connection layer 870 formed of the same material as the second electrode 770a is formed so as to electrically connect the line pad 850 and the signal supply pad 810.

Thus, a lower substrate of the touch screen-integrated display device of the present disclosure is completed.

As such, in a touch screen-integrated display device of the present disclosure, a part of the passivation layer is removed from a signal supply pad and control signal lines for supplying control signals to GIP circuits. Thus, a step height between a line pad and the signal supply pad can be reduced, and a contact resistance can be reduced.

Further, in the touch screen-integrated display device of the present disclosure, the part of the passivation layer is removed for placing the signal supply pad and the control signal lines for supplying control signals to GIP circuits. Thus, a contact resistance with respect to the signal supply pad can be reduced, and damage to the pad connection layer can be suppressed. Accordingly, deterioration in image quality can be prevented.

Figure 10:
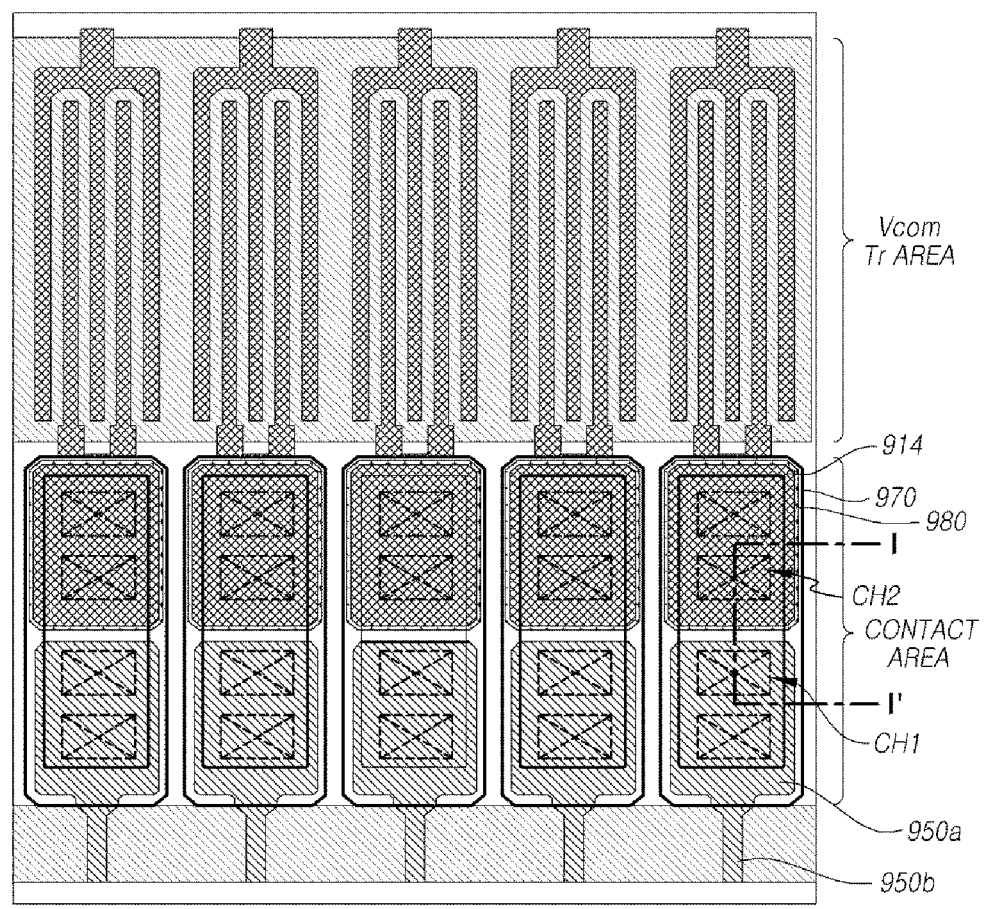
FIG. 10 is a diagram illustrating a common voltage supply area of the touch screen-integrated display device according to another exemplary embodiment of the present disclosure.
Figure 11:
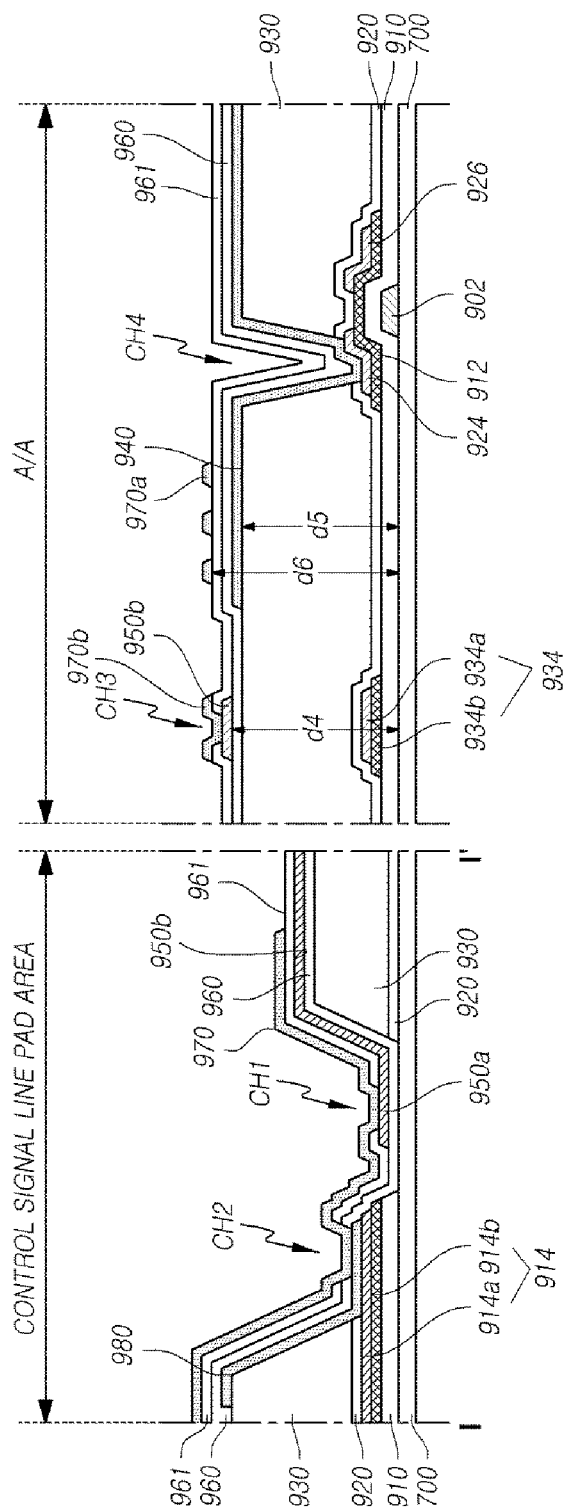
FIG. 11 is a cross-sectional view of a subpixel area and a control signal line pad area of the touch screen-integrated display device in FIG. 10.

FIG. 10 is a diagram illustrating a common voltage supply area of a touch screen-integrated display device according to another exemplary embodiment of the present disclosure, and FIG. 11 is a cross-sectional view of a subpixel area and a control signal line pad area of the touch screen-integrated display device in FIG. 10.

Referring to FIG. 10 and FIG. 11 together with FIG. 1, a plurality of touch electrodes TE is disposed on the display panel 110 of the touch screen-integrated display device according to another exemplary embodiment of the present disclosure, and a common voltage called touch drive signal is supplied to these touch electrodes TE. Therefore, the touch electrode TE may be referred to as a common electrode and a plurality of pixels corresponds to one common electrode (touch electrode TE).

The common voltage to be supplied to the touch electrode TE is supplied to each touch sensing line through the touch circuit 150 and the switch circuit 160. In FIG. 10, the common voltage supply area may be an overlapped area between the switch circuit 160 and the display panel 110. The switch circuit 160 configured to supply the common voltage may include a Vcom Tr area on which a plurality of transistors is disposed and a contact area for an electrical connection between a touch sensing line 950b and a source of a transistor disposed on the switch circuit 160 as illustrated in FIG. 10.

As illustrated in FIG. 10, each transistor on the switch circuit 160 configured to control a supply of the common voltage to the touch electrode TE of the display panel 110 is electrically connected to the touch sensing line 950b.

In FIG. 11, in the active area of the touch screen-integrated display device of the present disclosure, a gate electrode 902 is disposed on the substrate 700, the gate insulation layer 910 is disposed on the gate electrode 902, and a thin-film transistor including an active layer 912, a source electrode 924, and a drain electrode 926 disposed on the gate insulation layer 910 on the gate electrode 902. The source electrode and the drain electrode may be switched to each other.

The gate electrode 902 may be formed of double metal patterns or a plurality of metal patterns. Further, the metal patterns may have a structure in which a conductive metal pattern and a transparent conductive material pattern are mixed.

For example, the conductive metal pattern may be formed of a conductive metal such as aluminum (Al), tungsten (W), copper (Cu), molybdenum (Mo), chromium (Cr), titanium (Ti), molytungsten (MoW), molytitanium (MoTi), and copper/molytitanium (Cu/MoTi), but is not limited thereto. Further, the transparent conductive material pattern may be formed using at least one selected from the group consisting of ITO (Indium Tin Oxide), IZO (Indium Zinc Oxide), and CNT (Carbon Nano Tube), but is not limited thereto.

Further, a data line 934 is disposed on the gate insulation layer 910. The data line 934 may be formed of double patterns including a first data line pattern 934a and a second data line pattern 934b. The first data line pattern 934a may include a plurality of metal patterns. Further, the metal patterns may have the above-described structure in which a conductive metal pattern and a transparent conductive material pattern are mixed.

The second data line pattern 934b may be formed of the same material as the active layer 912.

The first protective layer 920 and the passivation layer 930 are disposed on the thin-film transistor and the data line 934. In the source electrode area 924 of the thin-film transistor, a contact hole CH4 is formed. The passivation layer 930 may be an overcoating layer formed of an organic film material.

Further, a first electrode 940 and a second electrode 970a are disposed to be overlapped with each other with second and third protective layers 960 and 961 interposed therebetween on the passivation layer 930. In addition, a distance between the substrate 700 and the touch sensing line 950b is d4, a distance between the substrate 700 and the first electrode 940 is d5, a distance between the substrate 700 and the second electrode 970a is d6, and d6>d4>d5. That is, the distances from the substrate 700 to the touch sensing line 950b, the first electrode 940 and the second electrode 970a are different form one another.

With regarding to differences with FIG. 7, the first electrode 940 is formed of a single body in the contact hole CH4 and is directly contacted with the source electrode 924. That is to say, the first electrode 940 is formed on the passivation layer 930 after the contact hole CH4 is formed in the passivation layer 930 unlike FIG. 7.

Accordingly, the embodiment in FIGS. 10 and 11 has more need of one mask process than that of FIG. 7 because of necessity using the separated mask processes for forming the contact hole and the first electrode.

Also, in the contact hole CH4, the second and the third protective layers 960 and 961 are stacked in the contact hole CH4 area without removing the second and third protective layers 960 and 961 because the connection pattern 770c is not needed to be formed to connect the first electrode on the passivation layer as shown FIG. 7.

The second electrode 970a is an electrode functioning as a common electrode in a display mode or also functioning as a touch electrode in a touch mode.

Further, a touch sensing line 950b is disposed on the second protective layer 960 on the passivation layer 930 overlapped the data line 934. The touch sensing line 950b is in parallel with the data line 934. The third protective layer 961 is formed on the touch sensing line 950b. The touch sensing line 950b is exposed to the outside through a contact hole CH3 where the third protective layer 961 is partially removed, and a touch connection layer 970b is electrically connected to the touch sensing line 950b through the contact hole CH3.

Then, in the control signal line pad area as shown in FIG. 11, a signal supply pad (source contact electrode) 914 extended from the source of the transistor disposed on the switch circuit 160 and a line pad (touch sensing pad) 950a extended from the touch sensing line 950b are electrically connected by a pad connection layer 970. The touch sensing line 950b and the touch sensing pad 950a are formed of the same material. The source contact electrode 914 may be the source of the transistor.

More specifically, the gate insulation layer 910 is disposed on the substrate 700, and the source contact electrode 914 is disposed on the gate insulation layer 910. The source contact electrode 914 and the data line 934 are formed of the same material. The source contact electrode 914 includes a first source contact layer 914a and a second source contact layer 914b, which are formed into a double-layer structure since a semiconductor layer and a metal layer are patterned at the same time through a halftone or diffraction mask process.

A first protective layer 920 and a passivation layer 930 are laminated on a part of the source contact electrode 914, and a part of the first protective layer 920 and the passivation layer 930 are removed to expose a part of the source contact electrode 914 to the outside. In an area where the source contact electrode 914 is exposed, a contact layer 980 is disposed, wherein the contact layer 980 is disposed in the control signal line pad area, formed on an inclined surface of the passivation layer 930, and disposed between the pad connection layer 970 and the source contact electrode 914. The contact layer 980 is patterned when a pixel electrode is formed, and, thus, the contact layer 980 is formed of the same material as the pixel electrode.

Further, the contact layer 980 is formed along the exposed area of the source contact electrode 914 and a slope of the passivation layer 930. Thus, a contact area of the source contact electrode 914 can be increased. Furthermore, the second and third protective layers 960 and 961 are laminated on the contact layer 980, and a pad contact hole CH2 is formed corresponding to the exposed source contact electrode 914.

Moreover, in an area corresponding to the touch sensing line 950b, the first protective layer 920 and the passivation layer 930 are disposed as being spaced apart by a predetermined distance from the source contact electrode 914 on the substrate 700. The second protective layer 960, the touch sensing line 950b, and the third protective layer 961 are laminated on the passivation layer 930.

Also, in an area corresponding to the touch sensing pad 950a, the second protective layer 960 is in contact with the substrate 700 between the passivation layers 930 on which the source contact electrode 914 and the touch sensing line 950b are disposed, respectively. The touch sensing pad 950a extended from the touch sensing line 950b is disposed on the second protective layer 960 and connected to the touch sensing line 950b along a slope of the passivation layer 930.

Further, the third protective layer 961 is disposed on the touch sensing pad 950a and includes a contact hole CH1 in a partial area. Accordingly, in the present exemplary embodiment, the pad connection layer 970 is electrically connected to the touch sensing pad 950a and the source contact electrode 914 through the contact holes CH1 and CH2, respectively, wherein the pad connection layer 970 and the signal supply pad 950a is connected through the contact layer 980.

As described above, in the present exemplary embodiment, the passivation layer 930 is removed from the contact area between the touch sensing line 950b and the transistor of the switch circuit area for supplying the common voltage to the touch electrode TE. Thus, the contact hole formed in the passivation layer can suppress a disconnection of the pad connection layer 970 configured to connect the source (source contact electrode 914) of the transistor and the touch sensing line 950a.

Further, in the present exemplary embodiment, a part of the passivation layer is removed from the contact area between the touch sensing pad and the switching element (transistor) configured to control a supply of the common voltage (touch sensing signal). Thus, a contact area with respect to the pad connection layer may have a maximized size, so that voltage supply characteristics can be improved.

Furthermore, in the present exemplary embodiment, a part of the passivation layer is removed from the contact area between the touch sensing line and the transistor. Thus, the pad contact holes may have sufficient sizes, so that electrical connection characteristics between the transistor and the touch sensing line can be improved.

Moreover, the above-described exemplary embodiments have the advantage of being able to be applied in the same manner to a contact area between a common voltage line, a data line, a gate line, or a touch sensing line electrically connected to pads configured to supply a signal (voltage) from the outside on an edge area of a display panel and also able to obtain the same effect.

The foregoing description and the accompanying drawings are provided only to illustrate the technical conception of the present disclosure, but it will be understood by a person having ordinary skill in the art that various modifications and changes such as combinations, separations, substitutions, and alterations of the components may be made without departing from the scope of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display device having an active area having a plurality of subpixels and a non-active area as an outer circumference of the active area, comprising:
    a thin-film transistor on a substrate in the subpixels at the active area;
    a passivation layer covering the thin-film transistor and having an opening area in the non-active area where the passivation layer is removed;
    a signal supply pad on the substrate in the opening area;
    a first protective layer on the signal supply pad and having at least one first contact hole to expose a portion of the signal supply pad;
    a line pad in the opening area not overlapping the passivation layer and on the first protective layer over the signal supply pad;
    a second protective layer having at least one second contact hole to expose a portion of the line pad; and
    a pad connection layer on the passivation layer and on the second protective layer in the opening area, and electrically connecting the line pad through the at least one second contact hole and the signal supply pad through the at least one first contact hole in the opening area of the non-active area.

2. The display device according to claim 1, further comprising:
    a gate line and a data line to define a subpixel;
    a touch sensing line in parallel with the data line; and
    a touch connection layer connected to the touch sensing line through at least one third contact hole.

3. The display device according to claim 1, further comprising a GIP (gate-in-panel) circuit connected to the line pad in the non-active area.

4. The display device according to claim 2, further comprising:
    a first electrode on the passivation layer and connected to a source electrode of the thin-film transistor through at least one fourth contact hole, and the first protective layer on the first electrode; and
    a second electrode on the second protective layer and overlapping the first electrode,
    wherein the touch sensing line, the first electrode and the second electrode are separated apart from a substrate by different distances.

5. The display device according to claim 4, wherein the touch sensing line and the line pad are formed of the same material.

6. The display device according to claim 1, wherein a quantity of the at least one first contact hole is plural, a quantity of the at least one second contact hole is plural.

7. The display device according to claim 2, wherein the signal supply pad and the gate line are formed of the same material.

8. The display device according to claim 2, wherein the signal supply pad and the data line are formed of the same material.

9. The display device according to claim 2, further comprising a gate insulation layer on which the signal supply pad and the data line are disposed.

10. The display device according to claim 9, further comprising a contact layer on the passivation layer.

11. The display device according to claim 10, wherein the contact layer is between the pad connection layer and the signal supply pad.

12. The display device according to claim 11, wherein the pad connection layer and the signal supply pad is connected through the contact layer.

13. The display device according to claim 4, wherein the second electrode is in a block shape.

14. The display device according to claim 4, wherein the second electrode has a size greater than a size of one subpixel.

15. The display device according to claim 4, wherein the first electrode is patterned into a comb teeth shape or a slit shape, and the second electrode is patterned into a plate shape.

16. The display device according to claim 4, wherein the first electrode is patterned into a plate shape and the second electrode is patterned into a comb teeth shape or a slit shape.

17. The display device according to claim 4, wherein the data line, the touch sensing line, opposite edges of the first electrode and opposite edges of the second electrode are in parallel with one another.

18. The display device according to claim 4, wherein the second electrode functions as a touch sensor during a touch mode and functions as a common electrode during a display mode, and the second electrode is formed of the same material as the pad connection layer.

19. A display device having an active area having a plurality of subpixels and a non-active area as an outer circumference of the active area, comprising:

a thin-film transistor on a substrate in the subpixels at the active area;

a passivation layer on the thin-film transistor;

a control signal line pad area at the non-active area where the passivation layer is removed;

a signal supply pad on the substrate in the control signal line pad area;

a first protective layer on the signal supply pad and having at least one first contact hole to expose a portion of the signal supply pad;

a line pad in the control signal line pad area not overlapping the passivation layer and on the first protective layer over the signal supply pad;

a second protective layer having at least one second contact hole to expose a portion of the line pad; and a pad connection layer on the passivation layer and on the second protective layer in the control signal line pad area, and electrically connecting the line pad through the at least one second contact hole and the signal supply pad through the at least one first contact hole in the control signal line pad area of the non-active area.

20. The display device according to claim 19, further comprising:

a gate line and a data line defining each subpixel; and a gate insulation layer disposed on the signal supply pad and the gate line, wherein the signal supply pad and the line pad are separated from each other by the gate insulation layer and the first protective layer in the control signal line pad area at the non-active area.

* * * * *